United States Patent

Ishii et al.

Patent Number: 5,916,635
Date of Patent: Jun. 29, 1999

[54] WATER-BASED HYDROPHILIC COATINGS AND A PROCESS FOR MANUFACTURING PRECOATED FIN MATERIALS FOR HEAT EXCHANGERS WITH USE OF SAID COATINGS

[75] Inventors: Toru Ishii; Kazuhiko Yamazaki; Reiko Takasawa, all of Shizuoka-ken, Japan

[73] Assignee: Nippon Light Metal Company, Ltd., Tokyo, Japan

[21] Appl. No.: 08/894,812

[22] PCT Filed: Mar. 26, 1997

[86] PCT No.: PCT/JP97/01024

§ 371 Date: Mar. 26, 1998

§ 102(e) Date: Mar. 26, 1998

[87] PCT Pub. No.: WO97/35938

PCT Pub. Date: Oct. 2, 1997

[30] Foreign Application Priority Data

Mar. 28, 1996  [JP]  Japan ........................... 8-97380

[51] Int. Cl.$^6$ ........................................... B05D 3/02
[52] U.S. Cl. .................. 427/388.2; 165/133; 427/388.4; 524/166; 524/493
[58] Field of Search ................... 165/133; 427/388.2, 427/388.4; 524/166, 493

[56] References Cited

U.S. PATENT DOCUMENTS

| 4,536,420 | 8/1985 | Rickert | 427/388.2 X |
| 4,671,825 | 6/1987 | Ishii et al. | 427/388.2 X |

(List continued on next page.)

FOREIGN PATENT DOCUMENTS

| 53-92846 | 8/1978 | Japan . |
| 55-99976 | 7/1980 | Japan . |

(List continued on next page.)

OTHER PUBLICATIONS

Patent Abstracts of Japan, "Surface Treatment of Metal", No. 53–92846, Aug. 15, 1978, Kansai Paint K.K.

Patent Abstracts of Japan, "Hydrophilic Treatment of Metal Surface", No. 55–99976, Jul. 30, 1980, Kansai Paint K.K.

(List continued on next page.)

*Primary Examiner*—Michael Lusignan
*Attorney, Agent, or Firm*—Nikaido, Marmelstein, Murray & Oram LLP

[57] ABSTRACT

This invention relates to water-based hydrophilic coatings suitable for giving hydrophilicity primarily to the surface of aluminum and to a process for manufacturing precoated fin materials for heat exchangers with use of said coatings. The coatings are composed of colloidal silica with a dispersed particle diameter of 5 to 100 nm, water-soluble polymers containing at least carboxylic acid polymers, anionic surfactants and water; the colloidal silica and the water-soluble polymers are present at a weight ratio of 30:70 to 70:30 on a solid basis in a combined content of 4 to 20% by weight, the content of carboxyl group in the carboxylic acid polymers contained in the water-soluble polymers is 20 to 63% by weight, the anionic surfactants are alkali salts of sulfosuccinic acid monoalkyl esters with alkyl groups containing 1 to 18 carbon atoms and present in an amount of 5 to 20% by weight of the combined solid content of the colloidal silica and the water-soluble polymers, and the pH is 1 to 5 as a whole. The process for manufacturing precoated fin materials for heat exchangers comprises applying the water-based hydrophilic coatings to the surface of aluminum fin materials to a solid weight of 0.3 to 1.5 g/m$^2$ and drying under heat.

15 Claims, 2 Drawing Sheets

U.S. PATENT DOCUMENTS

| | | | |
|---|---|---|---|
| 4,954,372 | 9/1990 | Sato et al. | 427/388.2 |
| 5,012,862 | 5/1991 | Espcut et al. | 165/133 |
| 5,137,067 | 8/1992 | Espert | 165/133 |
| 5,804,611 | 9/1998 | Takoh et al. | 524/166 X |

FOREIGN PATENT DOCUMENTS

| | | |
|---|---|---|
| 61-235468 | 10/1986 | Japan . |
| 1-36503 | 8/1989 | Japan . |
| 1-223188 | 9/1989 | Japan . |
| 6-221786 | 8/1994 | Japan . |
| 7-188585 | 7/1995 | Japan . |

OTHER PUBLICATIONS

Patent Abstracts of Japan, "Surface Hydrophilizing Composition", No. 59–170170, Sep. 26, 1984, Kansai Paint K.K.

Patent Abstracts of Japan, "Hydrophilic Film–Forming Aqueous Composition", No. 61–235468, Oct. 20, 1986, Kashiyuu K.K.

Patent Abstracts of Japan, "Hydrophilic Treatment Agent for Heat–Exchanger Fin Material", No. 1–223188, Sep. 6, 1989, Kansai Paint Co., Ltd.

Patent Abstracts of Japan, "Surface Treated Fin For Heat Exchanger", No. 6–221786, Aug. 12, 1994, Kobe Steel Ltd.

Patent Abstracts of Japan, "Fine Fiber–Containing Hydrophilic Treating Agent, and Fin Material Made of Al or Al Alloy Treated with the Same Treating Agent for Heat Exchanger", No. 07188585 A, Jul. 25, 1995, Kobe Steel Ltd.

WATER-BASED HYDROPHILIC COATINGS AND A PROCESS FOR MANUFACTURING PRECOATED FIN MATERIALS FOR HEAT EXCHANGERS WITH USE OF SAID COATINGS

Field of Technology

This invention relates to water-based hydrophilic coatings which are suitable for giving hydrophilic nature primarily to the surface of aluminum materials and to a process for manufacturing precoated fin materials for heat exchangers with the use of said coatings.

BACKGROUND TECHNOLOGY

Heat exchangers in air-conditioning equipment installed in buildings and automobiles generally contain fins which are fabricated in a specified shape from aluminum material (hereinafter signifying aluminum or its alloys) and the like. Such fins are arranged at closer intervals for the purpose of raising the heat exchange efficiency or under the influence of size reduction of air-conditioning equipment and, as a consequence, water condenses into globules on the surface of fins and forms a bridge between fins during the cooling operation. This phenomenon produces such undesirable results as increased resistance to air flow and lowered heat exchange efficiency.

A remedial practice has been a surface treatment to give hydrophilicity to the surface of fins as effected by applying hydrophilic coatings to fin materials prior to their fabrication into fins. The aim of this treatment is letting the enhanced hydrophilicity help condensing water to spread over the whole surface of the fins without forming globules and thus preventing the generation of the aforementioned phenomenon of bridging. Fin materials treated prior to fabrication with hydrophilic coatings as mentioned above are usually referred to as precoated fin materials.

Hydrophilic coatings of this kind, for example, contain silica and organic polymers as main components [Japan Kokai Tokkyo Koho No. Sho 53-92846 (1978), Japan Kokai Tokkyo Koho No. Sho 55-99976 (1980), and Japan Kokai Tokkyo Koho No. Hei 6-221786 (1994)]. Other examples are hydrophilic coatings containing surfactants in order to enhance initial hydrophilicity [Japan Kokai Tokkyo Koho No. Hei 7-188585 (1995)] and hydrophilic coatings obtained by mixing the aforementioned main components with silanes and dialkylsulfosuccinate ester salts and allowing the mixture to react at 50° C. or above [Japan Tokkyo Koho No. Hei 1-36503 (1989) and Japan Kokai Tokkyo Koho No. Hei 1-223188 (1989)].

The conventional hydrophilic coatings mainly composed of silica and organic polymers exhibit good hydrophilicity in the initial stage, but they tend to lose hydrophilicity gradually with the passage of time as the result of exposure to repeated dry and moist condition and deposition of air-borne hydrocarbons. Hence, there is a demand for sustained hydrophilicity.

Judging from their compositions, the hydrophilic coatings proposed in the aforementioned patent specifications yield an alkaline bath in use and, as described later, they tend to form a relatively smooth surface when applied to fin materials. Fins with such smooth surface not only lack sufficient ability to maintain hydrophilicity, but also generate another phenomenon of repelling water. In Example 1 of the aforementioned Japan Tokkyo Kokai Koho No. Hei 6-221786 (1994), a mixture (alkaline) of a silicate (sodium silicate), water-soluble resins [poly(sodium acrylate)] and water is applied to an aluminum plate to provide a fin material precoated with a hydrophilic film containing silica particles averaging 0.5 $\mu$m in diameter. The alkaline nature of the film thus formed, however, presents such problems as foaming and degradation of volatile press oil applied during the fabrication of fins, adverse effects on the corrosion resistance of fin materials, and changes in the film structure caused by elution of alkali with the passage of time.

It is described in Japan Kokai Tokkyo Koho No. Hei 7-188585 (1995) that there is no restriction on the kind of surfactants to be used, that the role of the surfactants is mainly to improve the initial hydrophilicity and prevent lowering of hydrophilicity by adsorption of press oil to be applied prior to fabrication, and that addition of crosslinking agents in a suitable amount is effective for securing sustained hydrophilicity over a prolonged period of time. The hydrophilic coatings described in the aforementioned patent specification, however, were not satisfactory to provide sustained hydrophilicity, particularly after application of volatile press oil. Furthermore, it is described in Japan Tokkyo Koho No. Hei 1-36503 (1989) and others that surfactants (dialkylsulfosuccinate ester salts) are heated at 50° C. or above to effect crosslinking with polymers in order to prevent lowering of the hydrophilicity due to running-off of surfactants during oil removal or in practical use. In spite of such heat treatment, the hydrophilic coatings lacked the ability to provide sustained hydrophilicity after application of volatile press oil. Moreover, the hydrophilicity tends to degrade markedly when the heat treatment after the application of the coatings is effected at high temperatures (approximately 230° C. or above) or the coatings tend to yield films of uneven appearance with varying hydrophilicity when the content of surfactants added to the coatings exceeds 0.5% by weight.

Precoated fin materials are normally rolled up for storage prior to fabrication and, when treated with the conventional coatings, they sometimes undergo blocking, that is, they stick together and do not separate.

An object of this invention is to solve the aforementioned problems of prior art and to provide water-based hydrophilic coatings which can be applied, for example, to the surface of aluminum materials not only with excellent hydrophilicity in the initial stage but also with sustained hydrophilicity after pre-fabrication application of volatile press oil or after high-temperature heat treatment.

Another object of this invention is to provide a process for manufacturing precoated fin materials of high quality for heat exchangers, said fin materials being excellently hydrophilic and blocking-free when rolled up.

DISCLOSURE OF THE INVENTION

The water-based hydrophilic coatings of this invention are composed of colloidal silica with a dispersed particle diameter of 5 to 100 nm, water-soluble polymers containing at least carboxylic acid polymers, anionic surfactants and water; the colloidal silica and the water-soluble polymers are present at a weight ratio of 30:70 to 70:30 on a solid basis in a combined content of 4 to 20% by weight, the content of carboxyl group in the carboxylic acid polymers contained in the water-soluble polymers is 20 to 63% by weight, the anionic surfactants are sulfosuccinic acid monoalkyl esters alkali salts with alkyl groups containing 1 to 18 carbon atoms and correspond to 5 to 20% by weight of the combined solid content of the colloidal silica and the water-soluble polymers, and the pH is 1 to 5 as a whole.

The process of this invention for manufacturing precoated fin materials for heat exchangers comprises applying water-based hydrophilic coatings directly to the surface of an aluminum fin material or to the film of a corrosion-resistant primer formed on said surface to a solid weight of 0.3 to 1.5 g/m² and drying by heating while said water-based hydrophilic coatings are composed of colloidal silica with a dispersed particle diameter of 5 to 100 nm, water-soluble polymers containing at least carboxylic acid polymers, anionic surfactants and water, the colloidal silica and the water-soluble polymers being present at a weight ratio of 30:70 to 70:30 on a solid basis in a combined content of 4 to 20% by weight, the content of carboxyl group in the carboxylic acid polymers contained in the water-soluble polymers being 20 to 63% by weight, the anionic surfactants being sulfosuccinic acid monoalkyl esters alkali salts with alkyl groups containing 1 to 18 carbon atoms and corresponding to 5 to 20% by weight of the combined solid content of the colloidal silica and the water-soluble polymers, and the pH being 1 to 5 as a whole.

The colloidal silica may be either acid-stabilized silica sol (pH 1 to 4) or alkali-stabilized silica sol (pH 9 to 10.5), both available as aqueous dispersion, and one with a dispersed particle diameter of 5 to 100 nm, preferably 10 to 30 nm, is useful. In the cases where alkali-stabilized colloidal silica is used, the colloidal silica will eventually be neutralized by carboxylic acids and, for minimized agglomeration of silica in a bath with a pH of 1 to 5, it is important to reduce as much as possible the time that the alkali-stabilized colloidal silica requires to pass through the neutral zone (pH 5 to 7) of a bath or the residence time in the neutral zone of a bath. Silica with a dispersed particle diameter of less than 5 nm tends to agglomerate easily; in consequence, a surface of required roughness cannot be obtained and the level of hydrophilicity becomes low. On the other hand, silica particles with a diameter of more than 100 nm become combined and adversely affect the stability of bath.

The water-soluble polymers contain water-soluble carboxylic acid polymers and, as needed, other polymers to be described later. The content of carboxyl group in the carboxylic acid polymers present in the water-soluble polymers or the proportion of carboxylic group (COOH) in the total carboxylic acid polymers is 20 to 63% by weight. A carboxyl content of less than 20% by weioght results in poor solubility in water. On the other hand, the upper limit (63% by weight) is a theoretical value calculated by assuming that the polymers are entirely composed of acrylic acid polymers and this upper limit would not be exceeded in practice. The content of carboxyl group is determined by chemical analysis (for example, neutralization titration to determine the amount reacted followed by calculation) when the specimen is a liquid before application or by infrared spectroscopy when the specimen is a film after application.

Water-soluble carboxylic acid polymers function as a pH controller before application of coatings and as a film-forming retainer or binder of colloidal silica particles in the film-forming step after application of coatings. As such carboxylic acid polymers are used acrylic acid-derived polymers singly or as a mixture; for example, poly(acrylic acid), poly(methacrylic acid), acrylic acid copolymers and esters of poly(acrylic acid). The pH of an aqueous solution of acrylic acid-derived polymers is 1 to 3. The average molecular weight of carboxylic acid polymers is 2,000 to 500,000, preferably 15,000 to 100,000. When the molecular weight is less than 2,000, the film-forming operation is difficult to perform as the film formed readily dissolves in water. On the other hand, carboxylic acid polymers with a molecular weight in excess of 500,000 produce abnormally high viscosity and poor solubility in water when incorporated into coatings; they are also responsible for poor compatibility with other polymers and are difficult to apply because of stringing.

Polymers to be used together with the water-soluble polymers include resins containing ether linkage in the molecule such as poly(ethylene glycol), polyetherpolyurethanes and polyglycidly ethers. The use of resins containing ether linkage yields films with a low degree of yellowing under heat.

The water-soluble polymers may be mixed with polymers functioning either as crosslinking agents capable of insolubilizing the carboxylic acid polymers in water or as film-forming softeners. Polymers functioning as crosslinking agents include polyhydric alcohols such as diethylene glycol, glycerin and pentaerythritol, water-soluble epoxy resins, water-soluble melamine resins and water-soluble polyurethanes. Polymers functioning as film-forming softeners include polyacrylamide, poly(ethylene glycol), poly (vinyl alcohol) and water-soluble polyesters. As for the proportion of the polymers in question, the crosslinking agents are added in any amount up to the limit which is equivalent to the carboxylic acids while the film-forming softeners are added in any amount up to the limit which is equal to the value obtained by subtracting the sum of the carboxylic acids and the crosslinking agents from the amount of the water-soluble polymers.

The colloidal silica and the water-soluble polymers are mixed at a weight ratio of 30:70 to 70:30, preferably 40:60 to 70:30, on a solid basis. The silica to polymer ratio with silica of less than 30 yields films in which the concentration of hydrophilic groups on the total surface is insufficient to obtain sustained hydrophilicity. On the other hand, a ratio with silica of more than 70 reduces the proportion of water-soluble polymers and the resulting film becomes fragile.

The colloidal silica and the water-soluble polymers are added with their sum controlled at 4 to 20% by weight of the coatings in whole. A sum of less than 4% by weight cannot give hydrophilicity of a desired level and the resulting films show loss in uniformity. A sum in excess of 40% by weight causes an increase in the viscosity, which makes the coating operation less efficient and causes loss in the uniformity of film.

There is no specific restriction on water and deionized water or pure water may be used. The water corresponds to the portion remaining after taking off the colloidal silica and the water-soluble polymers from the whole coatings and its content including optional components to be described later amounts to 80 to 96% by weight.

Coatings of this invention as a whole show a pH of 1 to 5. A pH of less than 1 is not suitable because the coating bath becomes unstable and there is the possibility of the surface of aluminum material or the film of a corrosion-resistant primer dissolving in the film-forming step. At a pH in excess of 5, colloidal silica does not separate out as spheres in the surface layer in the film-forming step after application of the coatings. The pH is controlled by controlling the amount of carboxylic acid polymers or by the use of a volatile acid such as nitric acid and acetic acid.

Anionic surfactants are added for the purpose of suppressing the lowering of hydrophilicity by volatile press oil to be applied to precoated fin materials prior to fabrication. Unlike alkali salts of dialkyl sulfosuccinate esters, alkali salts of monoalkyl sulfosuccinate esters of the following general formula [wherein R is an alkyl group containing 1 to 18 carbon atoms and M is an alkali metal] produce the aforementioned effect of suppressing the lowering of hydrophilicity and, in addition, an effect of roughening the film surface for extended duration of hydrophilicity.

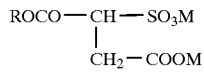

The aforementioned surfactants containing an alkyl group with more than 18 carbon atoms become less soluble in water and adversely affect the stability of coating bath. The number of carbon atoms in the alkyl group is preferably 5 to 14 and surfactants with the number of carbon atoms in this range dissolve uniformly in water, rarely bleed all at once to the surface of film and are effective for securing sustained hydrophilicity. It is permissible to use a combination of surfactants whose alkyl groups vary in the number of carbon atoms and, in this case, the condition of bleeding on the surface of film during heat treatment can be controlled with more ease. Although no specific restriction is imposed on the alkali metal salts, sodium salts are preferable from the viewpoint of cost.

Anionic surfactants consisting of alkali salts of sulfosuccinic acid monoalkyl esters are exemplified by sulfosuccinic acid monooctyl ester disodium salt and sulfosuccinic acid monolauryl ester disodium salt. The former can be prepared, for example, by sulfonating raw materials mainly consisting of octyl alcohol and maleic anhydride with acidic sulfurous acid as disclosed in an example in the specification of U.S. Pat. No. 2,628,091. When the raw material is naturally-occurring products such as palm oil, the reaction yields alkali salts of sulfosuccinic acid monoalkyl esters whose alkyl groups mainly contain 12 and 14 carbon atoms and vary widely in the number of carbon atoms from 8 to 18 as a whole. As mentioned above, the use of the alkali salts thus obtained facilitates the control of the condition of bleeding of surfactants on the surface of film. Anionic surfactants modified by addition of ethylene oxide may be used. The modified products exhibit enhanced solubility in water; however, addition of more than 3 moles of ethylene oxide to the ester part causes degradation of hydrophilicity after high-temperature heating and it is necessary to keep the number of moles of ethylene oxide at 3 or less in the addition reaction.

The anionic surfactants are added in an amount corresponding to 5 to 20% by weight, preferably 8 to 15% by weight, of the solid content of the colloidal silica and the water-soluble polymers. A content of less than 5% by weight is not enough to suppress the lowering of hydrophilicity to be caused by the application of volatile press oil. On the other hand, a content of more than 20% by weight adversely affects the water resistance of films. The proportion of the surfactants is 0.2 to 4% by weight of the entire coatings.

Addition of cationic or amphoteric surfactants to the hydrophilic coatings leads to poor stability of the coating bath (essentially the same as dispersion stability of colloidal siica) and colloidal silica agglomerates and precipitates in a short time in the presence of cationic surfactants. Use of salts of dialkyl sulfosuccinate esters markedly lowers hydrophilicity after high-temperature heating (approximately 230° C. or more) and excessive use (0.5% by weight or more) tends to yield uneven films with varying hydrophilicity.

Use of the aforementioned anionic surfactants is free from the problems described above. The dispersion stability of colloidal silica is not destroyed to induce agglomeration and precipitation and the hydrophilicity is not affected adversely after high-temperature heating effected for removal of applied volatile press oil. There is an additional advantage of no repelling of the applied volatile press oil.

It is allowable, as needed, to add to coatings of this invention optional components such as water-soluble organic solvents, leveling agents, antifoaming agents, antiseptics, antibacterial agents and fungicides. In this case, the addition is made while keeping the total amount of optional components within a range not exceeding 30% by weight of the whole coatings. Moreover, the content of each optional component is kept within a range of 0.1 to 10% by weight of the whole coatings. It is necessary to abstain from adding multivalent metal ions such as chromium ions to the coating bath. In the cases where chromium ions are added, acrylic acid polymers used as water-soluble polymers undergo polymerization and harden during storage of the bath and films of acceptable quality are difficult to form.

Water-soluble organic solvents are added to dilute the water-soluble polymers and concrete examples are alcohols such as methyl alcohol, ethyl alcohol, propyl alcohol, butyl alcohol and ethylene glycol. Leveling agents are added to lower the surface tension of coatings and concrete examples are silicon-based compounds such as polysiloxanes and silicone oligomers, fluorine-containing perfluoroalkyl compounds and acrylic compounds such as polyacrylates. Antifoaming agents are added to suppress the generation of foams during preparation and application of coatings and concrete examples are glycols such as polypropylene glycols, lower alcohols such as methanol, ethanol, isopropanol, n-butanol and isobutanol and metallic soaps derived from higher fatty acids. Cationic surfactants are undesirable for its adverse effect on the stability of coating bath. Antiseptics, antibacterial agents and fungicides are added to prevent the generation of odors originating from corrosion or fungi and concrete examples are imidazoles such as 2-(4-thiazolyl)benzimidazole, methyl 2-benzimidazolecarbamate and 2-dicarboximide. o-phenylphenol. It is desirable to add antiseptics, antibacterial agents or fungicides in a total amount of 5 to 20% by weight as solid.

It is also allowable to add surfactants other than the aforementioned anionic surfactants as optional components within the range of 25 to 50% by weight of the anionic surfactants. These optional surfactants are added, for example, to improve the applicability of coatings and secure initial hydrophilicity of films. Concretely, nonionic surfactants such as polyoxyethylenealkylamines and polyoxyethylene alkyl ethers and anionic surfactants such as alkylbenzenesulfonate salts and fatty acid salts are used.

Coatings of this invention are prepared as water-based compositions by mixing colloidal silica, water-soluble polymers, water and, as needed, optional components under the aforementioned conditions. The preparation is carried out so that the coatings may show a surface tension of 40 dynes or less and a viscosity of 5 to 100 cps (20° C.) depending upon the means of application. The coatings are applied to the surface of aluminum or its alloy, but they may be applied satisfactorily to other metallic materials, for example, for prevention of moisture condensation.

In the manufacture of precoated fin materials for heat exchangers with the use of coatings of this invention, the coatings are applied directly to the surface of an aluminum fin material or to the film of a corrosion-resistant primer formed on the surface and dried by heating. In the case of direct application, the fin material is degreased in advance. In the formation of the corrosion-resistant primer film, chromate treatment based on chromic acid-chromate, phosphoric acid-chromate or coating type chromate is applied to form inorganic films or acrylic resins and epoxy resins are applied to form corrosion-resistant resin films. The film thickness is preferably 0.01 to 0.2 μm for inorganic films and 0.5 to 3 μm for corrosion-resistant resin films.

Coatings are applied to a fin base material by such process as roll coating, bar coating, spray coating and dip coating to give a dry weight of 0.3 to 1.5 g/m². A dry weight of less than 0.3 g/m² gives films a low level of hydrophilicity and the required hydrophilicity may not be obtained in some parts of films if coatings were applied unevenly. A dry weight in excess of 1.5 g/m² is no more effective for further improvement of the level of hydrophilicity and produces peeling of films during fabrication of fins.

After application, it is desirable to dry the coatings under heat at 200 to 280° C. for 5 to 60 seconds. When heated below 200 ° C., the polymer components remain uncured and the resulting film dissolves or swells when brought into contact with water. On the other hand, when heated above 280 ° C., the polymer components undergo excessive curing and the resulting film becomes fragile. Heating for over 60 seconds not only produces no improvement of the film properties but also incurs higher production cost. The time for heating is preferably 10 to 30 seconds.

Precoated fin materials thus obtained are rolled up for storage as needed, coated with volatile press oil and fabricated by slitting or corrugating to yield fin materials of desired shape for heat exchangers. The volatile press oil is then volatilized by heating to expose the hydrophilic film.

Coatings of this invention contain colloidal silica as a stable colloidal solution; the coatings are applied and dried by heating while films form as water evaporates and the acidity rises (as the pH drops to 1 and less) and the colloidal silica turns into isolated spheres in the course of film formation while producing a roughened surface. The films show good adhesion. A high level of hydrophilicity is obtained in this manner and is maintained not only in the initial stage but also over a prolonged period of time. Moreover, excellent hydrophilicity is maintained after application of volatile press oil or after high-temperature heat treatment. The diameter of isolated particles of spherical silica gel is 0.1 to 2.5 μm, preferably 0.2 to 1.5 μm.

In the cases where coatings of this invention are applied, for example, to the surface of aluminum, colloidal silica turns into isolated spheres on the surface of films while exerting a roughening effect on the surface and the films show good adhesion and maintains a high level of hydrophilicity not only in the initial stage but also after prefabrication application of volatile press oil and after high-temperature heat treatment for removal of the press oil. Furthermore, colloidal silica is dispersed uniformly in coatings of this invention without agglomeration and precipitation and the surface of the resulting films does not repel volatile press oil to be applied before fabrication.

The fin materials precoated with coatings of this invention for use in heat exchangers have spherical silica gel distributed densely over the surface to provide a roughened condition and no blocking occurs when the materials are rolled up. Besides, the precoated fin materials show excellent fabricability in later steps.

The process of this invention thus provides the aforementioned excellent hydrophilicity and precoated fin materials of high quality which are free of blocking when rolled up. The precoated fin materials also show good fabricability when pressed.

This invention will be described in detail below with reference to examples. It goes without saying that this invention is not limited to these examples.

Preferred Embodiment of the Invention
EXAMPLE 1

Sixteen grams (16 g) of an aqueous poly(acrylic acid) solution (Acumer 1510, trade name of Rohm & Haas; solid content 25%, average molecular weight 60,000, content of carboxyl group 62% by weight) and 20 g of colloidal silica (Snowtex ST-0, trade name of Nissan Chemical Industries, Ltd.; solid content 20%, particle diameter 10~20 nm, pH 2~4) were mixed at the weight ratio of 50:50 on a solid basis and diluted with deionized water until the total weight reached 100 g. To the resulting bath was added sulfosuccinic acid monooctyl ester disodium salt of the following formula to 10% by weight of the total solids to give a hydrophilic coating composition. The bath thus obtained showed a pH of 3.2. The coating composition was applied to a degreased aluminum fin material with the aid of a coater to a dry weight of 0.8 g/m² and dried at 240° C. for 30 seconds to yield a precoated fin material.

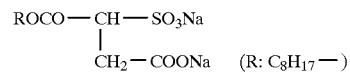

The film formed on the fin material was examined for its properties in respect to its hydrophilicity before application of volatile press oil, initial hydrophilicity after application of press oil, capability of maintaining hydrophilicity and average particle diameter of the silica sol. The initial hydrophilicity was evaluated by applying oil of second class (Daphne Punch Oil AF-2C, trade name of Idemitsu Kosan Co., Ltd.) as volatile press oil and drying at 160 ° C. for 5 minutes. The hydrophilicity of each category was evaluated by dropping 10 μl of deionized water to the surface of the film formed after application of the coating composition or press oil, allowing the water to spread for 1 minute and measuring the diameter (mmφ) of water drop. The capability of maintaining the hydrophilicity after application of press oil was evaluated by immersing the fin material in running water for 100 hours, drying in air at room temperature, and measuring the diameter (mmφ) of water drop as in the aforementioned test for the hydrophilicity. The average particle diameter was determined by measuring the actual dimension of particles in an enlarged photograph of the surface of the film.

Figure 1:
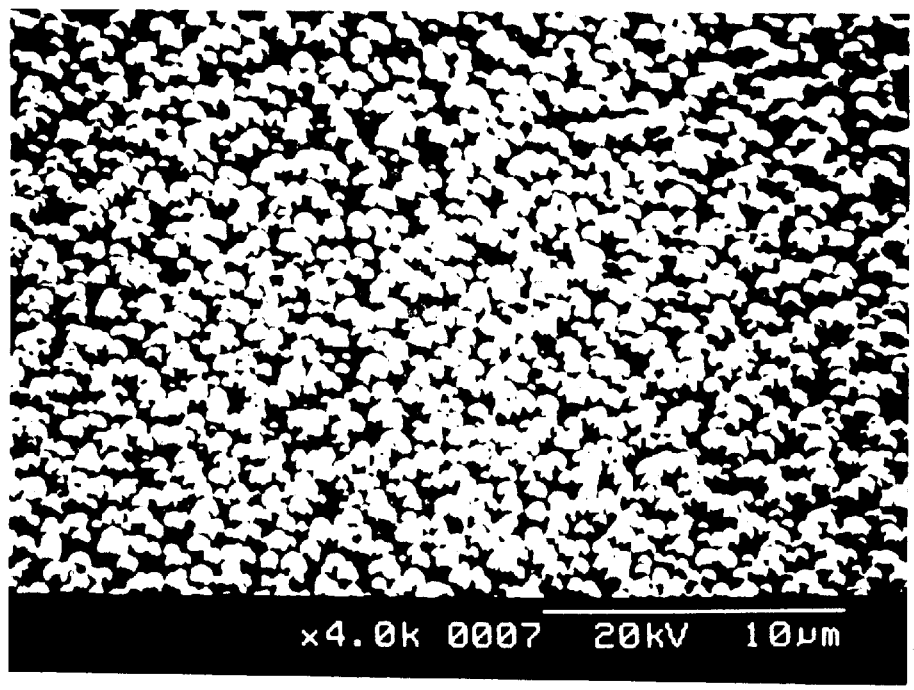
FIG. 1 is a photomicrograph of the surface of the film on the fin material relating to Example 1.

The results indicate that the hydrophilicity before application of press oil was 10 mmφ or more, the initial hydrophilicity after application of press oil was 10 mmφ or more, the capability of maintaining the hydrophilicity after application of press oil was 9~10 mmφ or more and the particle diameter was 0.3~1.4 μm. The surface of the film was observed by magnification followed by photographing; it is apparent from the photomicrograph (FIG. 1) that the silica sol is present distinctly as isolated particles densely formed on the surface of the film. As a consequence, the surface of the film formed by coatings of this invention has a structure composed of an assembly of particles. A test for the life of the coating bath indicated that the bath was stable even after 30 days. The same results were obtained for the life of bath in Examples 2 and 3.

EXAMPLES 2

A hydrophilic coating composition was prepared under the same conditions as in Example 1 except by adding sulfosuccinic acid monolauryl ester disodium salt (Kohakool L40, trade name of Toho Chemical Industry Co., Ltd.) of the following formula as surfactant to 15% by weight of the total solids. Kohakool L40 has mixed alkyl groups which consist of lauryl group with 12 carbon atoms as main member and others varying from one another in the number of carbon atoms. The bath showed a pH of 3.2. The coating compn. was applied to a degreased aluminum fin material and dried by heating under the same conditions as in Example 1 to yield a precoated fin material.

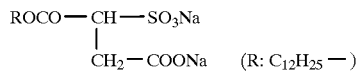

The film properties in this example were as follows; the hydrophilicity before application of press oil was 10 mmφ or more, the initial hydrophilicity after application of press oil was 10 mmφ or more, the capability of maintaining the hydrophilicity after application of press oil was 9~10 mmφ and the particle diameter was 0.3~1.4 μm. The surface of the film appeared the same as in Example 1.

EXAMPLE 3

A hydrophilic coating composition was prepared under the same conditions as in Example 1 except by adding polyoxyethylenesulfosuccini c acid monolauryl ester disodium salt (Kohakool L300, trade name of Toho Chemical Industry Co., Ltd.; number of moles of ethylene oxide aded =3) of the following formula as surfactant to 10% by weight of the total solids. The bath showed a pH of 3.2. The coating was applied to a degreased aluminum fin material and dried by heating under the same conditions as in Example 1 to yield a precoated fin material.

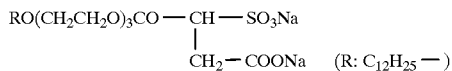

The film properties in this example were as follows; the hydrophilicity before application of press oil was 10 mmφ or more, the initial hydrophilicity after application of press oil was 10 mmφ or more, the capability of maintaining the hydrophilicity after application of press oil was 8~9 mmφ and the particle diameter was 0.3~1.4 μm. The surface of the film appeared the same as in Example 1.

Comparative Example 1

A hydrophilic coating composition was prepared under the same conditions as in Example 1 except by omitting the addition of the surfactant. The bath showed a pH of 2.6. The coating composition was applied to a degreased aluminum fin material and dried by heating under the same conditions as in Example 1 to yield a precoated fin material.

The film properties in this comparative example were as follows; the hydrophilicity before application of press oil was 10 mm φ or more, but the initial hydrophilicity after application of press oil was 5~6 mmφ, the capability of maintaining the hydrophilicity after application of press oil was 4.5~5 mmφ and the particle diameter was 0.3~1.4 μm. The surface of the film appeared roughly the same as in Example 1.

Comparative Example 2

A hydrophilic coating composition was prepared under the same conditions as in Example 1 except by adding sulfosuccinic acid dioctyl ester sodium salt (Lapisol B-30, trade name of Nippon Oil & Fats Co., Ltd.) of the following formula as surfactant until to 10% by weight of the total solids. The bath showed a pH of 2.7. The coating composition was applied to a degreased aluminum fin material and dried by heating under the same conditions as in Example 1 to yield a precoated fin material.

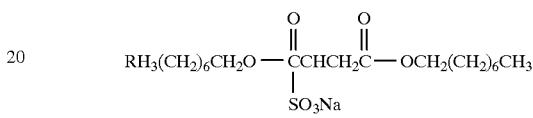

The film properties in this comparative example were as follows; the hydrophilicity before application of press oil was 10 mmφ or more, but the initial hydrophilicity after application of press oil was 8~10 mmφ, the capability of maintaining the hydrophilicity after application of press oil was 6~8 mmφ and the particle diameter was 0.3~1.4 μm. Unevenness due to uneven application of the coating composition was observed on the surface of the film. Separation of some components, likely the surfactants, was observed when the stability of the coating bath was examined.

Comparative Example 3

A hydrophilic coating composition was prepared under the same conditions as in Example 1 except by adding caustic soda until the pH of the bath became 9.0. The coating composition was applied to a degreased aluminum fin material and dried by heating under the same conditions as in Example 1 to yield a precoated fin material.

Figure 2:
FIG. 2 is a photomicrograph of the surface of the film on the fin material relating to Comparative Example 3.

The film properties in this comparative example were as follows; the hydrophilicity before application of press oil was 9 mmφ, the initial hydrophilicity after application of press oil was 5~7 mmφ, the capability of maintaining the hydrophilicity after application of press oil was 5~6 mmφ and the particle diameter was less than 0.01 μm. The surface of the film is practically smooth from its photomicrograph (FIG. 2).

Comparative Example 4

A hydrophilic coating composition was prepared under the same conditions as in Example 1 except by using 8 g of the colloidal silica and controlling the weight ratio of silica to acrylic polymers at 28.6:71.4. The bath showed a pH of 2.5. The coating composition was applied to a degreased aluminum fin material and dried by heating under the same conditions as in Example 1 except by controlling the dry weight at 0.6 g/m² in the coating step to yield a precoated fin material.

Figure 3:
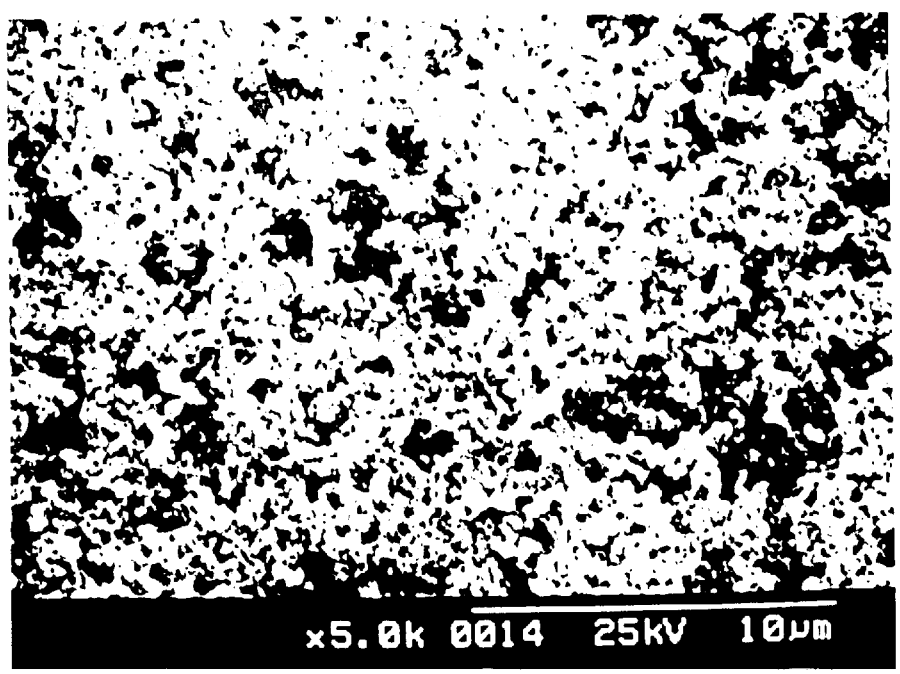
FIG. 3 is a photomicrograph of the surface of the film on the fin material relating to Comparative Example 4.

The film properties in this comparative example were as follows; the hydrophilicity before application of press oil was 7~8 mmφ, the initial hydrophilicity after application of press oil was 5~6 mmφ, the capability of maintaining the hydrophilicity after application of press oil was 5~6 mmφ and the particle diameter was less than 0.01 µm. The photomicrograph (FIG. 3) of the film surface shows that silica sol is interconnected in an indefinite shape. This accounts for the lower initial hydrophilicity here than in each example and Comparative Example 1.

What is claimed is:

1. Water-based hydrophilic coatings which are composed of colloidal silica with a dispersed particle diameter of 5 to 100 nm, water-soluble polymers containing at least carboxylic acid polymers, anionic surfactants and water, said colloidal silica and water-soluble polymers being present at a weight ratio of 30:70 to 70:30 on a solid basis in a combined content of 4 to 20% by weight and the content of carboxyl group in the carboxylic acid polymers contained in the water-soluble polymers being 20 to 63% by weight, said anionic surfactants being alkali salts of sulfosuccinic acid monoalkyl esters with alkyl groups containing 1 to 18 carbon atoms and present in an amount of 5 to 20% by weight of the combined solid content of the colloidal silica and the water-soluble polymers, and the pH being 1 to 5 as a whole.

2. Water-based hydrophilic coatings as described in claim 1 wherein said carboxylic acid polymers have an average molecular weight of 2,000 to 500,000.

3. Water-based hydrophilic coatings as described in claim 1 wherein said carboxylic acid polymers are acrylic acid-derived polymers.

4. Water-based hydrophilic coatings as described in claim 1 wherein said water-based polymers are polymers containing polyether linkage.

5. Water-based hydrophilic coatings as described in claim 1 wherein said anionic surfactants contain a combination of alkyl groups varying in the number of carbon atoms.

6. Water-based hydrophilic coatings as described in claim 1 wherein said anionic surfactants are sodium salts of monoalkyl esters.

7. Water-based hydrophilic coatings as described in claim 1 wherein said anionic surfactants are compounds modified by addition of 3 or less moles of ethylene oxide.

8. A process for manufacturing precoated fin materials for heat exchangers which comprises applying water-based hydrophilic coatings directly to the surface of an aluminum fin material or to the film of a corrosion-resistant primer formed on said surface to a solid weight of 0.3 to 1.5 g/m$^2$ and drying by heating while said water-based hydrophilic coatings are composed of colloidal silica with a dispersed particle diameter of 5 to 100 nm, water-soluble polymers containing at least carboxylic acid polymers, anionic surfactants and water, said colloidal silica and water-soluble polymers being present at a weight ratio of 30:70 to 70:30 on a solid basis in a combined content of 4 to 20% by weight and the content of carboxyl group in the carboxylic acid polymers contained in the water-soluble polymers being 20 to 63% by weight, said anionic surfactants being alkali salts of sulfosuccinic acid monoalkyl esters with alkyl groups containing 1 to 18 carbon atoms and present in an amount of 5 to 20% by weight of the combined solid content of the colloidal silica and the water-soluble polymers, and the pH being 1 to 5 as a whole.

9. A process as described in claim 8 wherein said carboxylic acid polymers have an average molecular weight of 2,000 to 500,000.

10. A process as described in claim 8 wherein said carboxylic acid polymers are acrylic acid-derived polymers.

11. A process as described in claim 8 wherein said water-based polymers are polymers containing polyether linkage.

12. A process as described in claim 8 wherein said anionic surfactants contain a combination of alkyl groups varying in the number of carbon atoms.

13. A process as described in claim 8 wherein said anionic surfactants are sodium salts of monoalkyl esters.

14. A process as described in claim 8 wherein said anionic surfactants are compounds modified by addition of 3 or less moles of ethylene oxide.

15. A process as described in claim 8 wherein said drying by heating is effected at a heating temperature of 200 to 280° C. for a heating time of 5 to 60 seconds.

* * * * *